United States Patent [19]

Hassett et al.

[11] Patent Number: 5,435,666
[45] Date of Patent: Jul. 25, 1995

[54] METHODS FOR ISOLATING A WATER TABLE AND FOR SOIL REMEDIATION

[75] Inventors: Alan F. Hassett; Stanley M. Porfido, both of Berwyn, Pa.

[73] Assignee: Environmental Resources Management, Inc., Exton, Pa.

[21] Appl. No.: 166,558

[22] Filed: Dec. 14, 1993

[51] Int. Cl.⁶ .......................... B09B 5/00; E02D 3/00
[52] U.S. Cl. ..................................... 405/128; 405/258
[58] Field of Search ................. 405/36, 52, 128, 129, 405/258, 267; 166/246; 588/249, 250

[56] References Cited

U.S. PATENT DOCUMENTS

| | | | |
|---|---|---|---|
| 4,765,902 | 8/1988 | Ely et al. | 405/128 X |
| 4,877,358 | 10/1989 | Ressi Di Cervia | 405/128 X |
| 5,249,888 | 10/1993 | Braithwaite et al. | 405/128 |
| 5,271,693 | 12/1993 | Johnson et al. | 405/128 |
| 5,277,518 | 1/1994 | Billings et al. | 405/128 |

*Primary Examiner*—David H. Corbin
*Attorney, Agent, or Firm*—Lerner, David, Littenberg, Krumholz & Mentlik

[57] ABSTRACT

Methods of soil containment and soil remediation are disclosed. The methods contemplate selecting a surface area associated with a subterraneal volume wherein the subterraneal volume includes ground water beneath the surface area. Barrier means are arranged around at least part of the perimeter of the subterraneal volume for isolating the surface area and the associated subterraneal volume from adjacent subterraneal volumes. The ground water table is then lowered to a desired depth so that a contaminated vadose zone is exposed. The ground water is maintained at such lowered depth by means of gas pressure. Optionally, the exposed vadose zone may be remediated.

86 Claims, 2 Drawing Sheets

METHODS FOR ISOLATING A WATER TABLE AND FOR SOIL REMEDIATION

FIELD OF THE INVENTION

The present invention relates to methods for lowering the water table, preferably in order to isolate the water table from contaminants in the soil thereabove. More particularly, the present invention relates to a method of lowering the water table to isolate and contain a contaminated vadose zone and optionally, to remediate same.

BACKGROUND OF THE INVENTION

The earth's natural resources are becoming more and more scarce as industrialization and commercialization increase throughout the world. Thus, the problem of maintaining the remaining natural resources, such as water and soil, in an uncontaminated state has been given a great amount of attention in recent years. In particular, there is a great need to address the problem of preventing ground water from coming into contact with contaminated soil and thereafter maintaining such ground water in a natural state. Additionally, problems involving the remediation of a vadose zone (a volume of soil above a localized water table and its capillary fringe within the earth), which includes volatile contaminants has been the subject of a tremendous amount of effort by engineers and scientists employed by both the government and soil remediation companies.

The great effort expended by such engineers and scientists has resulted in various methods for removing contaminants from the vadose zone. However, there has been no known method proposed for physically separating the water table from a subterraneal volume of contaminated soil and for thereafter maintaining the water table apart from the contaminated soil site without continuous pumping of groundwater which is inefficient and undesirable.

With regard to basic soil remediation methods, one such method includes soil vacuuming extraction techniques, which are now well known in the art. Examples of such techniques are described more fully in U.S. Pat. No. 4,183,407.

Another method for removing contaminants from the vadose zone includes simple excavation. This entails removal of all of the contaminated soil from the vadose zone. When this method is used, the soil may be taken to an off-site or on-site location for various processing where the contaminants are removed therefrom. The cleansed soil can then be placed back into the original excavation site. Alternatively, the excavated site can be filled with fresh soil while the contaminated soil is appropriately disposed elsewhere.

Still other techniques include steps for removing contaminants from soil located beneath the water table itself. These techniques teach the injection of air into the contaminated soil beneath the water table to urge contaminants therefrom into the vadose zone above the water table and ultimately into a withdrawal well similar to the wells used for soil vacuuming extraction techniques. This method for removing contaminants is described more fully in U.S. Pat. Nos. 4,809,673 and 4,183,407.

None of the foregoing techniques address methods for lowering the water table beneath the contaminated earth to expose a vadose zone including contaminants so that the water table can be maintained remote from such contaminants. In this regard, the prior art has not presented any method for isolating a contaminated vadose zone apart from the water table after the water table has been lowered. Additionally, the prior art has not posed a solution for maintaining the water table at a predetermined lower depth after it has been lowered.

Still further, the only solution posed in the prior art to lower the water table has been to pump water therefrom until the water table has been lowered and the vadose zone has been exposed. This method presents a problem because it may be extremely expensive or even unfeasible when large amounts of ground water or when certain types of soils are present. More particularly, each type of soil has a specific hydraulic conductivity. The hydraulic conductivity is a factor which varies depending on the internal resistance of various soils, for instance the hydraulic conductivity of "loose" soil such as sand and gravel is high. Conversely, the hydraulic conductivity of "tight" soil such as silt and clay is low. Groundwater pumping is particularly difficult in soils that have low hydraulic conductivities, and under certain circumstances may be impractical or even impossible.

It should be understood that the term "soil" as used in this application is to be broadly construed, and thus, includes all types of subterraneal materials such as clay, sand, silts, standard earthen soil suitable for plant life, gravel, large stone, etc.

The present invention solves all of the aforementioned problems by disclosing new and unobvious methods for lowering the water table and maintaining same at a predetermined appropriate lower depth so that contaminants in the soil will be permanently separated from the water table. In certain instances, the water table may become improved through a natural attenuation process. The present invention also provides a new and unobvious method for lowering the water table, isolating the vadose zone by forming a hydraulic seal, and thereafter remediating the altered vadose zone. Finally, the present invention provides a new method for simply maintaining a water table at a lower depth, regardless of how the water table is lowered to such depth, and thereafter either permanently isolating the water table from volatile contaminants located in the vadose zone or remediating same.

SUMMARY AND OBJECTS OF THE INVENTION

One preferred method of the present invention provides a method for soil containment comprising the steps of selecting a surface area associated with a subterraneal volume wherein the subterraneal volume includes ground water located at a predetermined original depth beneath the surface area. Barrier means are arranged around the perimeter of the subterraneal volume for isolating the surface area and the associated subterraneal volume from adjacent subterraneal volumes. Gas is then applied at a predetermined positive pressure to preselected locations within the barrier means so that the ground water will be lowered from its predetermined original depth beneath the surface area to an altered depth which is lower than the predetermined original depth.

Preferably, the step of selecting a surface area associated with the subterraneal volume comprises the steps of locating contaminated soil within the subterraneal volume and determining the location of the contaminated soil beneath the surface area. It is contemplated that ground water normally flows through at least a portion of the contaminated soil. Most preferably, the step of arranging the barrier means around the perimeter of the subterraneal volume comprises arranging the barrier means to extend vertically downward from the surface area into uncontaminated soil surrounding the contaminated soil.

The method of the present invention also preferably includes the step of forming a hydraulic seal between the ground water and the barrier means so that gas forced into the barrier means is prevented from flowing outside of the barrier thereby maintaining a positive pressure therein. The hydraulic seal may be formed by selecting the predetermined positive pressure of the gas so that the altered depth of the ground water is above the bottom-most end of the barrier means and so that the ground water is maintained at the altered depth.

It is also preferable to drill through soil within the subterraneal volume to create at least one well having a well point at a predetermined well depth adjacent the ground water prior to applying the gas within the barrier means. The gas may be injected from a gas source through gas supply ports which correspond to each of the wells including the well points. The pressure of the applied gas will then displace the ground water toward the altered depth. A first positive pressure will be maintained at the well point of each well and a second pressure will exist at the surface area whereby the first positive pressure is greater than the second pressure and the ground water is maintained at the altered depth by the first positive pressure.

Optionally, the method may include the step of placing cap means over the surface area for maintaining a positive pressure within the subterraneal volume whereby the ground water is maintained at the lowered depth beneath the surface area. The cap means may comprise various compositions such as a clay composition, a synthetic composition or a composite composition which includes both clay and synthetic matter.

The gas source preferably comprises a centrifugal blower connected to a manifold assembly having a plurality of gas supply ports thereon. However, in alternate embodiments, the gas source may comprise a positive displacement blower, an air compressor or other blower means that can produce a suitable gas flow rate to create sufficient pressure in accordance with the present invention. During operation, it is desirable to maintain the pressure at the well points at a greater pressure than the pressure at the surface area. Most desirably, the pressure at the surface area will be about atmospheric pressure.

According to a preferred method, the gas supplied will be air. However, in alternate preferred methods, different types of gases may be applied to lower a localized water table or to maintain the water table at the lowered depth.

In still another preferred method, the step of arranging the barrier means around the perimeter of the subterraneal volume may comprise the steps of excavating soil to form a trench adjacent the perimeter and thereafter, constructing a slurry wall within the trench. The step of constructing the slurry wall may comprise placing a bentonite mixture in the trench to support the walls and then filling the trench with a further mixture of bentonite and soil. In other preferred methods, the trench may be filled with various mixtures including a mixture of bentonite and cement.

Alternatively, the step of arranging barrier means around the perimeter of the subterraneal volume may comprise the steps of selecting flexible membrane means and placing the flexible membrane means into the subterraneal volume adjacent the perimeter thereof to a predetermined depth beneath the surface area. This may be accomplished by various methods including driving the flexible membrane into the soil, vibrating the flexible membrane into the soil or placing the flexible membrane into a trench after a slurry wall has been at least partially constructed therein.

If flexible membrane means are used as barrier means, the flexible membrane means may be made of various compositions sufficient to substantially prevent water, gas and soil contaminants from permeating therethrough. In a particularly preferred embodiment, the flexible membrane means may comprise high density polyethylene.

According to another aspect of the methods of the present invention, ground water is lowered from its predetermined original depth beneath the surface area to an altered depth by conventional pumping techniques. The ground water is then maintained at the altered depth by applying gas at a predetermined positive pressure to preselected locations within the barrier means.

According to yet another aspect of the present invention, a method of soil remediation is disclosed. The method of soil remediation comprises the steps of selecting a surface area associated with a subterraneal volume including contaminated soil and ground water located at a predetermined original depth beneath the surface area. Barrier means are then arranged around the perimeter of the subterraneal volume for isolating the surface area and the associated subterraneal volume from adjacent subterraneal volumes. Gas is then applied at a predetermined positive pressure at preselected locations within the barrier means in order to lower the ground water from its predetermined original depth beneath the surface area to an altered depth and to maintain said ground water at said altered depth below at least a portion of the contaminated soil. Contaminants are then removed from the contaminated soil.

Alternatively, a method of soil remediation is disclosed wherein pumping is employed to lower the ground water from its predetermined original depth beneath the surface area to its altered depth below at least a portion of the contaminated soil. Gas is then applied at a predetermined positive pressure to preselected locations within the barrier means so that the ground water will be maintained at the altered depth.

The step of removing contaminants from the contaminated soil may comprise various soil remediation techniques. It is particularly desirable for the step of removing the contaminants to comprise the application of techniques similar to known soil vacuuming extraction techniques. Remediation may also be accomplished by volatilizing the contaminants into a gas stream wherein the gas is selected from a group of gases or a mixture thereof and wherein the gas does not comprise solely air. Further remediation may be performed by known biological remediation treatment techniques, or other remediation techniques not specifically discussed herein.

Accordingly, it is an object of the present invention to provide a method of soil containment wherein a localized water table is lowered by applying gas thereto at a predetermined positive pressure. It is a further object of the present invention to maintain the lowered ground water table at an altered depth below at least a portion of contaminated soil by applying gas at a predetermined positive pressure to the lowered ground water table.

It is a further object of the present invention to provide methods of soil remediation wherein a localized ground water table is lowered to expose a vadose zone including volatile contaminants, and thereafter, the contaminants are removed therefrom.

It is a further object of the present invention to provide economical and efficient methods of lowering the ground water table and/or maintaining the lowered ground water table at the lowered depth.

The above description, as well as further objects, features and advantages of the present invention will be more fully understood when taken in conjunction with the following detailed description of the methods of the present invention and the accompanying drawings.

DETAILED DESCRIPTION OF THE PREFERRED EMBODIMENT

In accordance with one preferred method of the present invention, it is desirable to lower a localized ground water table from a site including contaminated soil and to maintain the water table at the lowered depth apart from the contaminants. It is also desirable to locate, isolate, and optionally remove contaminants in situ from soils by one or more soil remediation techniques. However, the use of such techniques are complicated when the contaminated soil is located below the ground water table. In instances when contaminants are located in soils below the ground water table, it has been common practice to use ground water pumping techniques to lower the localized ground water table level. As discussed above, such pumping techniques can be problematic depending on the hydraulic conductivity of the soil and the overall cost involved in undertaking such an operation.

Figure 1:
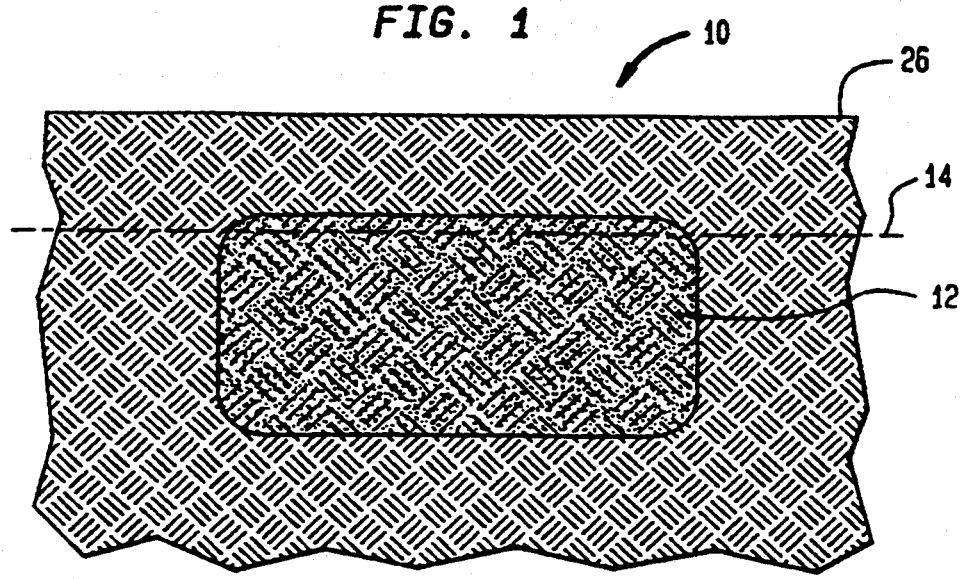
FIG. 1 is a diagrammatic cross-sectional view of a section of the earth including contaminated soil arranged under the water table.

FIG. 1 illustrates a site including contaminated soil 12 located both above and beneath the water table 14 and a surface layer of uncontaminated soil 26 in a particular subterraneal volume 10. In accordance with one preferred method of the present invention, the site of the contaminants in the soil is located by methods well known in the art. Once it is determined that the contaminated soil is located beneath the water table 14, it is preferable to construct and arrange a vertical barrier around the perimeter of a selected subterraneal volume which includes the contaminated soil. This feature of the present invention is clearly shown in FIGS. 2-3.

Figure 2:
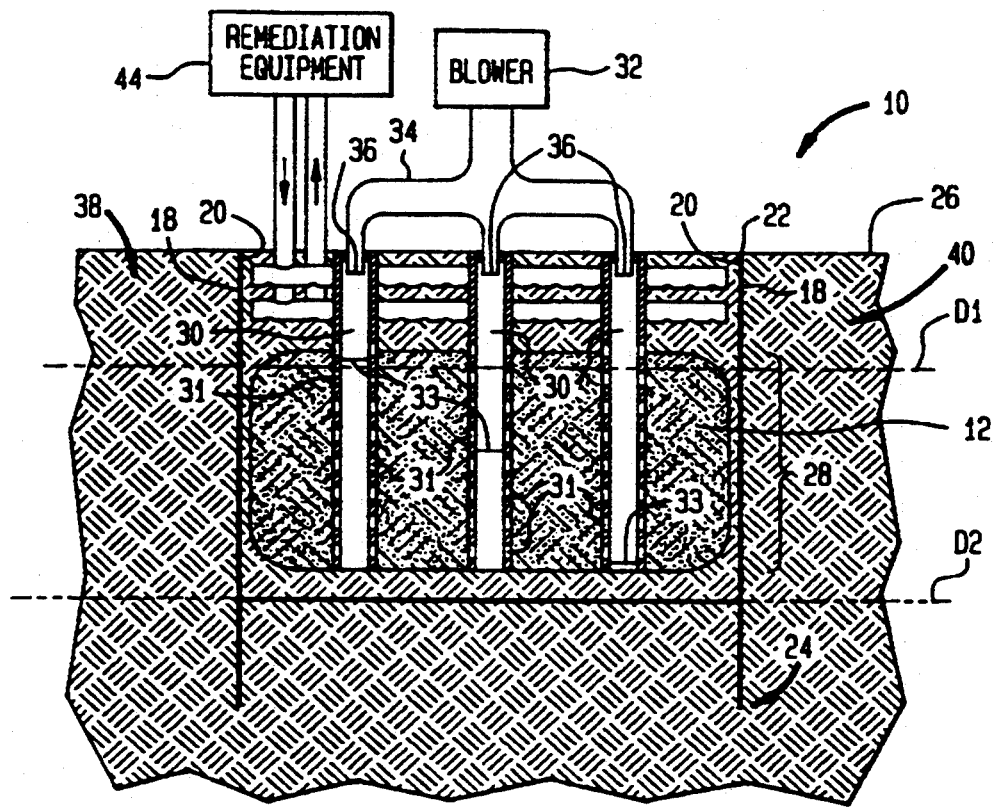
FIG. 2 is a diagrammatic cross-sectional view of the section of the earth shown in FIG. 1 with the water table lowered to expose a vadose zone in accordance with a method of the present invention.
Figure 3:
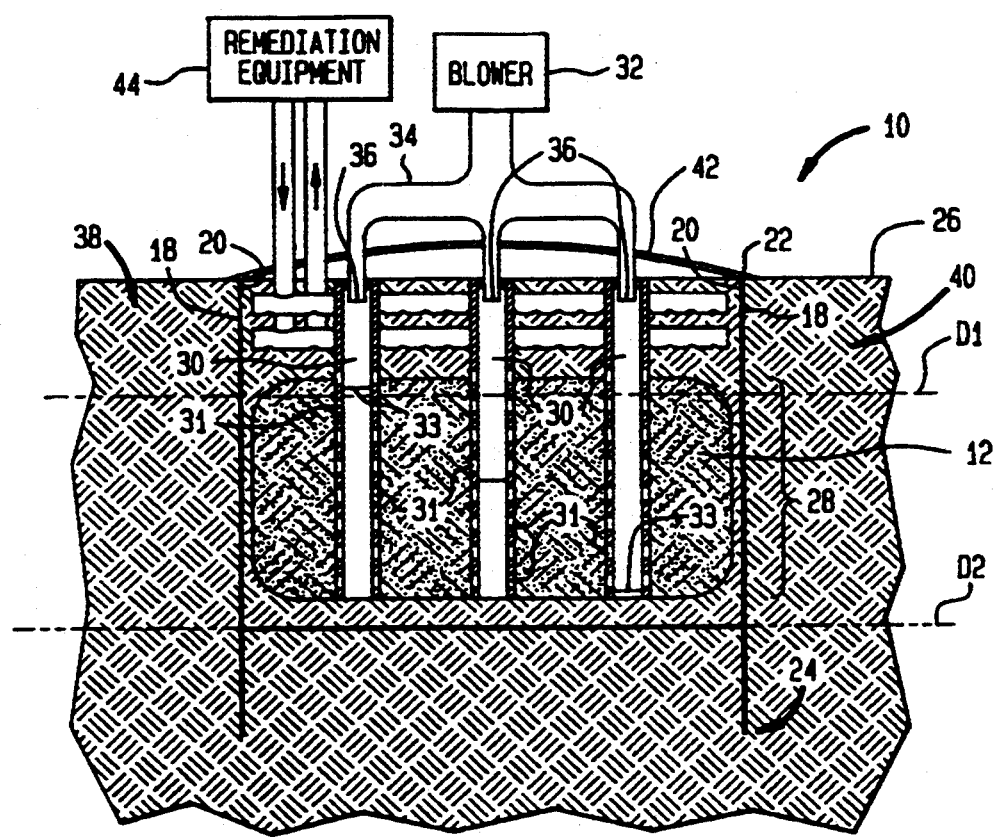
FIG. 3 is a diagrammatic cross-sectional view of the section of the earth shown in FIG. 2 in accordance with a further method of the present invention.

Thus, FIGS. 2 and 3 disclose vertical barriers 20, which are particularly suitable for use in accordance with the method of the present invention, in assembled position surrounding the perimeter 18 of a subterraneal volume 10. In one preferred embodiment, the vertical barrier 20 comprises a flexible membrane which may be made of polyethylene or other material which is suitable to prevent water, gas and soil contaminants from permeating therethrough. For example, the flexible membrane liner marketed under the trade name GEOLOCK is suitable for use in accordance with the method of the present invention. As the technical specifications are well known for such flexible vertical membranes, they will not be repeated in detail herein.

The flexible membrane includes a top-most end 22 and a bottom-most end 24. The flexible membrane may be inserted into assembled position around the perimeter of the selected subterraneal volume 10 by using well known vibrational techniques for driving the flexible membrane into the earth. Such techniques are suitable, for instance, for driving the flexible membrane beneath the earth's surface 26 so that the top-most end 22 is near the surface 26 and the bottom-most end 24 is at a depth of about three to fifty meters below the surface 26 when used in soils, such as a soft alluvial clay which have a relatively low driving resistance. As can be appreciated, when the flexible membrane is driven into soils having a relatively high driving resistance, such as a dense glacial till, it may be less easily inserted and therefore usually is installed to significantly shallower depths by using identical vibration techniques.

Another suitable technique for placing the flexible membrane around the perimeter 18 of the associated subterraneal volume 10 comprises digging a trench, and thereafter, placing the flexible membrane into the trench or placing the flexible membrane into the trench and thereafter driving same to a selected predetermined depth beneath the soil. Additional known methods exist for arranging flexible barriers into assembled position beneath the soil. However, it is important in each of the methods for those installing such flexible barriers to take precautions to avoid damaging the barriers during installation.

Alternatively, the vertical barrier 20 may comprise a slurry wall in place of a flexible polyethylene barrier. The use of slurry walls within a subterraneal volume is also known in the art. Such known methods may include digging a trench around the desired perimeter of the subterraneal volume and placing a mixture including bentonite to further support the walls during the excavation process. Upon completion of the trench, it may be filled with a further suitable mixture, such as a mixture of bentonite and soil or bentonite and cement to complete the slurry wall.

Notwithstanding the particular type of vertical barrier 20 selected for use in accordance with the method of the present invention, it is important for such barrier to remain impervious to ground water, gas and contaminants. Thus, the particular type of barrier that may be suitable for a particular application may be selected in accordance with predetermined specifications.

Once the vertical barrier 20 is placed in assembled position around the perimeter 18 of the subterraneal volume 10, it is desirable to lower the water table 14 so that the contaminants in the soil may be exposed in a vadose zone 28. In accordance with a preferred method of the present invention, the water table 14 is lowered from its original depth D1 to an altered depth D2 by use of externally generated gas pressure created by producing a desired gas flow rate. The result of the application of such gas pressure is evident from the cross-sectional views shown in FIGS. 2-3.

As is also evident from FIGS. 2-3, a plurality of wells 30 may be drilled, either before or after construction of the vertical barrier 20. These wells 30 may be initially drilled into the soil down to a depth immediately above the water table, or they may be drilled to a depth substantially corresponding with the desired altered depth D2 to which the water table 14 will be lowered. A centrifugal blower 32 is selected for producing the predetermined gas pressure which may be used for lowering of the water table as will be discussed further below. A manifold assembly 34 comprising a plurality of gas ports 36 is arranged for fluid communication with the centrifugal blower so that gas produced by the blower will be injected through each of the gas ports 36 and into the corresponding predrilled wells 30. The gas ports 36 are connected in a substantially air-tight manner to the mouth of corresponding wells 30.

Application of the gas pressure to the water table 14 will have the effect of lowering the water table 14. In accordance with one preferred method, the water table 14 drops as the gas flows out of the corresponding wells 30 through slots which may be arranged at screened intervals 31 as shown in FIGS. 2 and 3. This may be accomplished by known techniques which utilize an inflatable/deflatable packer unit 33. The packer unit 33 may be selectively raised and lowered so that it will cause the gas pumped into the wells 30 to flow out of selected ones of the screened slots 31 that are initially arranged below the water table. As the water table is lowered below the next lower screened interval 31, the packer unit 33 can be deflated and reinstalled at the height of the next lower screened interval 31. Preferably, the packer units 33 in each of the wells 30 are lowered in unison with each other. However, for illustrative purposes, the packer units 33 are shown in three different positions in the wells 30 of FIGS. 2 and 3. Such illustration is intended to facilitate appreciation as to the degree of movement of the packer units 33 during lowering of the water table 14 between its predetermined original depth D1 to the desired altered depth D2. Adjusting the location of the packer units 33 within the wells 30 will permit the gas pressure to always remain adjacent the top level of the water table 14 until the water table 14 has been lowered to its desired depth D2. It should be appreciated that use of wells 30 including screened intervals 31 in combination with an adjustable packer unit 33, is one manner of lowering the water table in accordance with the present invention. In other embodiments, various methods including manually lowering the gas outlet at the bottom of the wells may be employed while remaining within the scope of the present invention. In all embodiments where gas pressure is being used to lower the water table 14, it is important that the structure of the wells permit a sufficient gas flow rate to flow therefrom so that the pressure applied to the water table is sufficient to lower it to the desired altered depth D2.

The steps involved in lowering of the water table 14 may vary depending on the hydraulic conductivity of the soil in which the wells are drilled. For example, in a soil which has a relatively low hydraulic conductivity, such as clay, the flow rate of the gas required to produce an appropriate pressure to lower the water table would be lower than the flow rate of the gas required to produce such appropriate pressure in soils having a relatively high hydraulic conductivity, such as sand or gravel.

When the water table 14 is lowered from its original depth D1 to the desired altered depth D2, the gas pressure produced by the flow rate injected by the centrifugal blower 32 through the manifold assembly 34 will be adjusted so that the water table 14 will be maintained at the altered depth D2. In this regard, various factors may be considered such as natural seasonal changes in the water table 14. Such an altered depth is shown in FIGS. 2-3 as being above the bottommost portion 24 of the vertical barrier 20 so that the contaminated vadose zone 28 will be exposed and a hydraulic seal (unnumbered) will be formed at the intersection of the water table 14 and the vertical barrier 20 around the perimeter 18 of an associated subterraneal volume 10.

As an alternative method for lowering the water table 14 and maintaining same at a preselected depth below the contaminated vadose zone 28, the traditional method of pumping ground water may be employed. However, this method differs from the prior art in that wells 30 are predrilled below the original water table level to the lower altered depth at which the ground water will be lowered. Once the water table 14 is pumped down to the lower altered depth, the ground water pumps may be turned off and the centrifugal blower 32 will be turned on so that pressurized gas will be injected through the gas ports 36 of the manifold assembly 34 and into the wells 30. This gas pressure will be selected so that the water table 14 will be constantly maintained at the lower altered depth. Additionally, as shown in FIGS. 2-3, the vertical barrier 20 will isolate the selected subterraneal volume 10 from adjacent subterraneal volumes 38-40 so that the contaminated vadose zone 28 may be contained outside of the ground water.

As discussed above, different types of soils have different properties which affect the gas flow rate and thus, pressure, required to lower and maintain the water table 14 at its lower altered depth D2. Thus, the properties of the soils and project specific factors may affect an optional step in accordance with a preferred method of the present invention. More particularly, as shown in FIG. 3, it may be desired to construct a cap 42 above the surface area 26 which defines the subterraneal volume 10 to help maintain pressure on the water table 14 so that same will be maintained at its lower depth D2. Suitable caps 42 may be constructed of clay, other soils synthetic materials or a composite composition including both synthetic materials and clay and/or other soils. The structures of such caps 42 are known in the art and have been used to keep rain water out of a selected volume of soil. However, the method of the present invention contemplates an entirely new use for such caps 42; namely, to help keep gas pressure within the subterraneal volume 10 adjacent the localized ground water table 14.

Under certain situations, the use of an external cap 42 may not be required. For example, the use of a cap 42 may be preferred in relatively loose soils, such as gravel, which include a high conductivity. The high conductivity of the soil contributes to a small head loss (i.e., a small pressure drop over the distance between the altered ground water table D2 and the surface area). Conversely, in relatively tight soils, such as clay, where the hydraulic conductivity is low, the associated head loss will be great. Therefore, it may not be required to use an external cap 42 to maintain pressure on the altered water table D2 because the low hydraulic conductivity of clay may function as a natural cap.

As discussed above, a centrifugal blower 32 is used to force gas, such as air, through 36 of an associated manifold assembly 34. The pressurized gas is then injected into predrilled wells 30 down to the well points 31 (i.e., the area at the bottom of the well adjacent the ground water table). Thus, the method of the present invention will have the effect of creating a predetermined positive pressure at the well points 31. Under ideal conditions, the surface area 26 will remain at atmospheric pressure. Of course, this pressure may vary depending on external or internal factors.

Once the cap 42 is in place and the localized ground water table 14 is lowered to the altered depth D2 and hydraulic seal is formed between the water table 14 and the vertical barrier 20, the contaminated vadose zone 28 can be said to be effectively isolated and contained from the outside environment. As shown in FIGS. 2-3, the isolated subterraneal volume 10 is completely self-contained and is sufficiently isolated from adjacent subterraneal volumes 38-40.

Desirably, the method of the present invention contemplates removal of contaminants from the vadose zone 28 after same has been isolated as discussed above. This may be accomplished through known methods of in situ soil remediation to remediate volatile contaminants which have leaked into the soil. The method of the present invention particularly contemplates the use of various soil remediation techniques, such as those discussed above, for removing contaminants from the vadose zone 28. In accordance with a preferred step of the present method, techniques similar to well-known soil vacuuming extraction techniques are used to accomplish the desired remediation. Suitable equipment 44 for accomplishing such soil treatment techniques is shown in block form in FIGS. 2 and 3. Remediation may also be accomplished by volatilizing the contaminants into a gas stream wherein the gas is selected from a group of gases or a mixture thereof and wherein the gas does not comprise solely air. Further remediation may be performed by known biological remediation treatment techniques, or other remediation techniques not specifically discussed herein.

Although, the present invention is not limited to such techniques, it is important to isolate the vadose zone 28 by lowering the water table 14 as discussed above. After this has been accomplished, remediation may or may not be necessary. For instance, in certain situations, the vadose zone 28 may be effectively contained within the isolated area created in accordance with the method of the present invention, and therefore, the water table 14 will be removed from the contaminated zone. In some instances, the water table may become improved through a natural attenuation process. If desired, such containment may be carried on as long as the barrier does not decompose or leak and the gas pressure is constantly applied to maintain on the localized ground water table 14 at lowered depth D2.

Specific examples of parameters which may vary due to the inherent hydraulic conductivities of soils and the required gas pressures will now be discussed to more clearly describe the preferred methods of the present invention.

EXAMPLE 1

In a first example, the contaminated site exists at sea level where the ground level atmospheric pressure $P_0$ is about 14.7 psia (psi absolute). The soil may comprise a silt having a pneumatic conductivity of about 0.008 ft/day. The use of a cap such as the cap 42 is not required in this example. Remediation equipment 44 may be utilized to create a slightly negative pressure $P_1$ of about 14.5 psia just below the surface of the soil. This may be accomplished by using a network of horizontal pipes having apertures therein as shown in FIGS. 2 and 3. The use of the remediation equipment 44 having a pipe network will help assure that undesirable gases do not escape from contaminated site through the surface of the soil and into the atmosphere.

The water table can be lowered approximately ten feet by applying gas flow sufficient to achieve a pressure $P_2$ of about 19 psia. The $\Delta P_{1-2}$ of about 4.5 psi (19 psia − 14.5 psia) is created by the resistance of the silt to an upward gas velocity of about 2.5 ft/day.

EXAMPLE 2

In a second example, the contaminated site is present in sand. A cap 42 is required in this example because it is impractical to create a large enough flow rate through the sand to create a head loss sufficient to establish a desired pressure without using such a device. The sand may have a pneumatic conductivity of about 0.500 ft/day. Again assuming that the surface of the sand in this example is at sea level, the ground level atmospheric pressure $P_0$ is about 14.7 psia.

The cap 42 may be about three feet thick. Thus, it exerts a predetermined weight upon the soil on which it is placed. The weight of the cap 42 resists a positive pressure $P_1$ of about 16.7 psia at a location just below the surface of the sand. The water table can be lowered approximately seven feet by applying gas flow sufficient to achieve a pressure $P_2$ of about 17.7 psia. As discussed above, the $\Delta P_{0-1}$ of about 2.0 psi (16.7 psia − 14.7 psia) is resisted by the weight of the cap on the surface of the soil. The $\Delta P_{1-2}$ of about 1.0 psi (17.7 psia − 16.7 psia) is created by the sand's resistance to an upward gas velocity of about 500 ft/day.

While the foregoing description and FIGURES are directed to the preferred methods in accordance with the present invention, it should be appreciated that numerous modifications can be made to each of the steps of the present method. Indeed, such modifications are encouraged to be made in the order in which the steps are conducted and the specific materials used for accomplishing such steps without departing from the spirit and scope of the present methods. Thus, the foregoing description of the preferred methods should be taken by way of illustration rather than by way of limitation with respect to the present invention, which is defined by the claims set forth below.

What is claimed is:

1. A method of soil containment comprising the steps of:
    selecting a surface area associated with a subterraneal volume, said subterraneal volume including ground water located at a predetermined original depth beneath said surface area;
    arranging barrier means around the perimeter of said subterraneal volume for isolating said surface area and said associated subterraneal volume from adjacent subterraneal volumes; and
    applying gas at a predetermined positive pressure to preselected locations within said barrier means in order to lower said ground water from said predetermined original depth beneath said surface area to an altered depth, said altered depth being lower than said predetermined original depth.

2. The method of claim 1 wherein said step of selecting a surface area associated with said subterraneal volume comprises the steps of locating contaminated soil within said subterraneal volume and determining its position below said surface area.

3. The method of claim 2 wherein said ground water normally flows through at least a portion of said contaminated soil, said barrier means includes a topmost and a bottom-most end, said step of arranging barrier means around said perimeter of said subterraneal volume comprises arranging said barrier means to extend vertically downward from said surface area to a location below said contaminated soil.

4. The method of claim 3 further comprising the step of forming a hydraulic seal between said ground water and said barrier means so that gas forced into said barrier means is prevented from flowing outside of said barrier means thereby maintaining a positive pressure therein.

5. The method of claim 4 wherein said step of forming said hydraulic seal comprises selecting said predetermined positive pressure so that said altered depth of said ground water is above said bottom-most end of said barrier means, and maintaining said ground water at said altered depth.

6. The method of claim 1 wherein said step of applying said gas to preselected locations within said barrier means comprises drilling through soil in said subterraneal volume to create at least one well having a well point at a predetermined well depth adjacent said ground water; arranging at least one gas supply port associated with a gas source within said at least one well; forcing said gas from said gas source through said at least one gas supply port to said preselected locations within said barrier means including said at least one well point to displace said ground water toward said altered depth; and maintaining a first positive pressure at said well point and a second pressure at said surface area whereby said first positive pressure is greater than said second pressure and said ground water is maintained at said altered depth thereby.

7. The method of claim 6 further comprising the step of placing cap means over said surface area for maintaining said first positive pressure.

8. The method of claim 1 further comprising the step of placing cap means over said surface area for maintaining said predetermined positive pressure within said subterraneal volume whereby said ground water is maintained at said altered depth beneath said surface area.

9. The method of claim 6 wherein said gas source comprises blower means for generating a positive gas flow.

10. The method of claim 6 wherein said second pressure at said surface area is maintained at about atmospheric pressure.

11. The method of claim 6 wherein said at least one gas supply port comprises a plurality of gas supply ports connected to a common manifold assembly.

12. The method of claim 1 wherein said gas comprises air.

13. The method of claim 1 wherein said step of arranging barrier means around said perimeter of said subterraneal volume comprises the steps of excavating soil to form a trench adjacent said perimeter; and constructing a slurry wall within said trench.

14. The method of claim 13 wherein said step of constructing said slurry wall comprises placing a bentonite mixture in said trench to support the walls thereof; and filling said trench with a further mixture of bentonite and soil.

15. The method of claim 13 wherein said step of constructing said slurry wall comprises placing a bentonite mixture in said trench to support the walls thereof; and filling said trench with a further mixture of bentonite and cement.

16. The method of claim 1 wherein said step of arranging barrier means around said perimeter of said subterraneal volume comprises the steps of selecting flexible membrane means and placing said flexible membrane means into said subterraneal volume adjacent said perimeter thereof to a predetermined depth beneath said surface area.

17. The method of claim 16 wherein said step of placing said flexible membrane into said subterraneal volume comprises driving said flexible membrane into the soil thereof.

18. The method of claim 16 wherein said step of placing said flexible membrane into said subterraneal volume comprises using vibrating means to vibrate said flexible membrane into the soil thereof.

19. The method of claim 13 further comprising the step of selecting flexible membrane means and placing said flexible membrane means into said trench whereby said flexible membrane means is arranged adjacent said slurry wall.

20. The method of claim 16 wherein said flexible membrane means comprises high density polyethylene.

21. The method of claim 16 wherein said flexible membrane means comprises a plurality of flexible sheets interconnected to each other so that water, gas and soil contaminants cannot substantially permeate therethrough.

22. The method of claim 8 wherein said cap means comprises clay.

23. The method of claim 8 wherein said cap means comprises a synthetic composition.

24. The method of claim 8 wherein said cap means comprises a composite composition including clay and synthetic material.

25. The method of claim 7 wherein said cap means comprises clay.

26. The method of claim 7 wherein said cap means comprises a synthetic composition.

27. The method of claim 7 further comprising the step of forming a hydraulic seal between said ground water and said barrier means so that gas forced into said barrier means is prevented from flowing outside of said barrier means thereby maintaining a positive pressure therein.

28. The method of claim 6 wherein said step of arranging barrier means around said perimeter of said subterraneal volume comprises the steps of excavating soil to form a trench adjacent said perimeter; and constructing a slurry wall within said trench.

29. The method of claim 28 wherein said step of constructing said slurry wall comprises placing a bentonite mixture in said trench to support the walls thereof; and filling said trench with a further mixture of bentonite and soil.

30. The method of claim 28 wherein said step of constructing said slurry wall comprises placing a bentonite mixture in said trench to support the walls thereof; and filling said trench with a further mixture of bentonite and cement.

31. The method of claim 6 wherein said step of arranging barrier means around said perimeter of said subterraneal volume comprises the steps of selecting flexible membrane means and placing said flexible membrane means into said subterraneal volume adjacent said perimeter thereof to a predetermined depth beneath said surface area.

32. The method of claim 31 wherein said step of placing said flexible membrane into said subterraneal volume comprises driving said flexible membrane into the soil thereof.

33. The method of claim 31 wherein said step of placing said flexible membrane into said subterraneal volume comprises using vibrating means to vibrate said flexible membrane into said soil thereof.

34. The method of claim 28 further comprising the step of selecting flexible membrane means and placing said flexible membrane means into said trench whereby said flexible membrane means is arranged adjacent said slurry wall.

35. The method of claim 31 wherein said flexible membrane means comprises high density polyethylene.

36. The method of claim 31 wherein said flexible membrane means comprises a plurality of flexible sheets interconnected to each other so that water, gas and soil contaminants cannot substantially permeate therethrough.

37. A method of soil containment comprising the steps of:
selecting a surface area associated with a subterraneal volume, said subterraneal volume including ground water located at a predetermined original depth beneath said surface area;
arranging barrier means around the perimeter of said subterraneal volume for isolating said surface area and said associated subterraneal volume from adjacent subterraneal volumes;
pumping said ground water from said predetermined original depth beneath said surface area in order to lower said ground water from said predetermined original depth to an altered depth, said altered depth being lower than said predetermined original depth; and
applying gas at a predetermined positive pressure to preselected locations within said barrier means in order to maintain said ground water at said altered depth.

38. The method of claim 37 wherein said step of selecting a surface area associated with said subterraneal volume comprises the steps of locating contaminated soil within said volume and determining its position below said surface area.

39. The method of claim 38 wherein said ground water normally flows through at least a portion of said contaminated soil, said barrier means includes a topmost and an bottom-most end, said step of arranging said barrier means around said perimeter of said subterraneal volume comprises arranging said barrier means to extend vertically downward from said surface area to a location below said contaminated soil.

40. The method of claim 39 further comprising the step of forming a hydraulic seal between said ground water and said barrier means so that gas forced into said barrier means is prevented from flowing outside of said barrier means thereby maintaining a positive pressure therein.

41. The method of claim 40 wherein said step of forming said hydraulic seal comprises selecting said altered depth of said ground water to be above said bottom-most end of said barrier means, and selecting said predetermined positive pressure so that said ground water is maintained at said altered depth.

42. The method of claim 37 wherein said step of applying said gas to preselected locations within said barrier means comprises drilling through soil in said subterraneal volume to create at least one well having a well point at a predetermined well depth adjacent said lower depth of said ground water; arranging at least one gas supply port associated with a gas source within said at least one well; forcing said gas from said gas source through said at least one gas supply port to said preselected locations within said barrier means including said at least one well point after said pumping of said ground water to altered lower depth; and maintaining a first positive pressure at said well point and a second pressure at said surface area whereby said first positive pressure is greater than said second pressure so that said ground water is maintained at said altered depth.

43. The method of claim 42 further comprising the step of placing cap means over said surface area for maintaining said first positive pressure.

44. The method of claim 37 further comprising the step of placing cap means over said surface area for maintaining said predetermined positive pressure within said subterraneal volume whereby said ground water is maintained at said altered depth beneath said surface area.

45. The method of claim 42 wherein said gas source comprises blower means for generating a positive gas flow.

46. The method of claim 42 wherein said second pressure at said surface area is maintained at about atmospheric pressure.

47. The method of claim 42 wherein said at least one gas supply port comprises a plurality of gas supply ports connected to a common manifold assembly.

48. The method of claim 37 wherein said gas comprises air.

49. The method of claim 37 wherein said step of arranging barrier means around said perimeter of said subterraneal volume comprises the steps of excavating soil to form a trench adjacent said perimeter; and constructing a slurry wall within said trench.

50. The method of claim 49 wherein said step of constructing said slurry wall comprises placing a bentonite mixture in said trench to support the walls thereof; and filling said trench with a further mixture of bentonite and soil.

51. The method of claim 49 wherein said step of constructing said slurry wall comprises placing a bentonite mixture in said trench to support the walls thereof; and filling said trench with a further mixture of bentonite and cement.

52. The method of claim 37 wherein said step of arranging barrier means around said perimeter of said subterraneal volume comprises the steps of selecting flexible membrane means and placing said flexible membrane means into said subterraneal volume adjacent said perimeter thereof to a predetermined depth beneath said surface area.

53. The method of claim 52 wherein said step of placing said flexible membrane into said subterraneal volume comprises driving said flexible membrane into the soil thereof.

54. The method of claim 52 wherein said step of placing said flexible membrane into said subterraneal volume comprises using vibrating means to vibrate said flexible membrane into the soil thereof.

55. The method of claim 49 further comprising the step of selecting flexible membrane means and placing said flexible membrane means into said trench whereby said flexible membrane means is arranged adjacent said slurry wall.

56. The method of claim 52 wherein said flexible membrane means comprises high density polyethylene.

57. The method of claim 52 wherein said flexible membrane means comprises a plurality of flexible sheets interconnected to each other so that water and soil contaminants cannot permeate therethrough.

58. The method of claim 44 wherein said cap means comprises clay.

59. The method of claim 44 wherein said cap means comprises a synthetic composition.

60. The method of claim 44 wherein said cap means comprises a composite composition including clay and synthetic materials.

61. The method of claim 43 wherein said cap means comprises clay.

62. The method of claim 43 wherein said cap means comprises a synthetic composition.

63. The method of claim 43 further comprising the step of forming a hydraulic seal between said ground water and said barrier means so that gas forced into said barrier means is prevented from flowing outside of said barrier means thereby maintaining a positive pressure therein.

64. The method of claim 42 wherein said step of arranging barrier means around said perimeter of said subterraneal volume comprises the steps of excavating soil to form a trench adjacent said perimeter; and constructing a slurry wall within said trench.

65. The method of claim 64 wherein said step of constructing said slurry wall comprises placing a bentonite mixture in said trench to support the walls thereof; and filling said trench with a further mixture of bentonite and soil.

66. The method of claim 64 wherein said step of constructing said slurry wall comprises placing a bentonite mixture in said trench to support the walls thereof; and filling said trench with a further mixture of bentonite and cement.

67. The method of claim 42 wherein said step of arranging barrier means around said perimeter of said subterraneal volume comprises the steps of selecting flexible membrane means and placing said flexible membrane means into said subterraneal volume adjacent perimeter thereof to a predetermined depth beneath said surface area.

68. The method of claim 67 wherein said step of placing said flexible membrane into said subterraneal volume comprises driving said flexible membrane into the soil thereof.

69. The method of claim 67 wherein said step of placing said flexible membrane into said subterraneal volume comprises using vibrating means to vibrate said flexible membrane into said soil thereof.

70. The method of claim 64 further comprising the step of selecting flexible membrane means and placing said flexible membrane means into said trench whereby said flexible membrane means is arranged adjacent said slurry wall.

71. The method of claim 67 wherein said flexible membrane means comprises high density polyethylene.

72. The method of claim 67 wherein said flexible membrane means comprises a plurality of flexible sheets interconnected to each other so that water and soil contaminants cannot permeate therethrough.

73. A method of soil remediation comprising the steps of:
selecting a surface area associated with a subterraneal volume, said subterraneal volume including contaminated soil and ground water located at a predetermined original depth beneath said surface area;
arranging barrier means around the perimeter of said subterraneal volume for isolating said surface area and said associated subterraneal volume from adjacent subterraneal volumes;
applying gas maintained at a predetermined positive pressure at preselected locations within said barrier means in order to lower said ground water from said predetermined original depth beneath said surface area to an altered depth and to maintain said ground water at said altered depth, said altered depth being below at least a portion of said contaminated soil; and
removing contaminants from said contaminated soil.

74. The method of claim 73 wherein said barrier means includes a top-most end and a bottom-most end, said step of arranging barrier means around said perimeter of said subterraneal volume comprises arranging said barrier means to extend vertically downward from said surface area to a location below said contaminated soil.

75. The method of claim 74 further comprising the step of forming a hydraulic seal between said ground water and said barrier means so that gas forced into said barrier means is prevented from flowing outside of said barrier means thereby maintaining a positive pressure therein.

76. The method of claim 75 wherein said step of forming said hydraulic seal comprises selecting said predetermined pressure so that said altered depth of said ground water is above said bottom-most end of said barrier means, and maintaining said ground water at said lower depth.

77. The method of claim 76 wherein said step of removing said contaminants from said contaminated soil comprises application of techniques similar to soil vacuuming extraction techniques to said contaminated soil.

78. The method of claim 76 wherein said step of removing said contaminants from said contaminated soil comprises applying a gas stream to said contaminants whereby said contaminants are volatilized.

79. The method of claim 76 wherein said step of removing said contaminants from said contaminated soil comprises application of biological remediation treatment techniques.

80. A method of soil remediation comprising the steps of:
selecting a surface area associated with a subterraneal volume, said subterraneal volume including ground water located at a predetermined original depth beneath said surface area;
arranging barrier means around the perimeter of said subterraneal volume for isolating said surface area and said associated subterraneal volume from adjacent subterraneal volumes;
pumping said ground water from said predetermined original depth beneath said surface area in order to lower said ground water from said predetermined original depth to an altered depth, said altered depth being below at least a portion of said contaminated soil;

removing contaminants from said contaminated soil; and applying gas at a predetermined positive pressure to preselected locations within said barrier means so that said ground water will be maintained at said altered depth.

81. The method of claim 78 wherein said barrier means includes a top-most end and a bottom-most end, said step of arranging barrier means around said perimeter of said subterraneal volume comprises arranging said barrier means to extend vertically downward from said surface area to a location below said contaminated soil.

82. The method of claim 79 further comprising the step of forming a hydraulic seal between said ground water and said barrier means so that gas forced into said barrier means is prevented from flowing outside of said barrier means thereby maintaining a positive pressure therein.

83. The method of claim 80 wherein said step of forming said hydraulic seal comprise selecting said altered depth to lie above said bottom-most end of said barrier, and selecting said predetermined pressure so that said ground water is maintained at said altered depth.

84. The method of claim 81 wherein said step of removing said contaminants from said contaminated soil comprises application of techniques similar to soil vacuuming extraction techniques to said contaminated soil.

85. The method of claim 81 wherein said step of removing said contaminants from said contaminated soil comprises applying a gas stream to said contaminants so that said contaminants are volatilized.

86. The method of claim 81 wherein said step of removing said contaminants from said contaminated soil comprises application of biological remediation treatment techniques.

* * * * *